United States Patent Office 3,267,350
Patented August 16, 1966

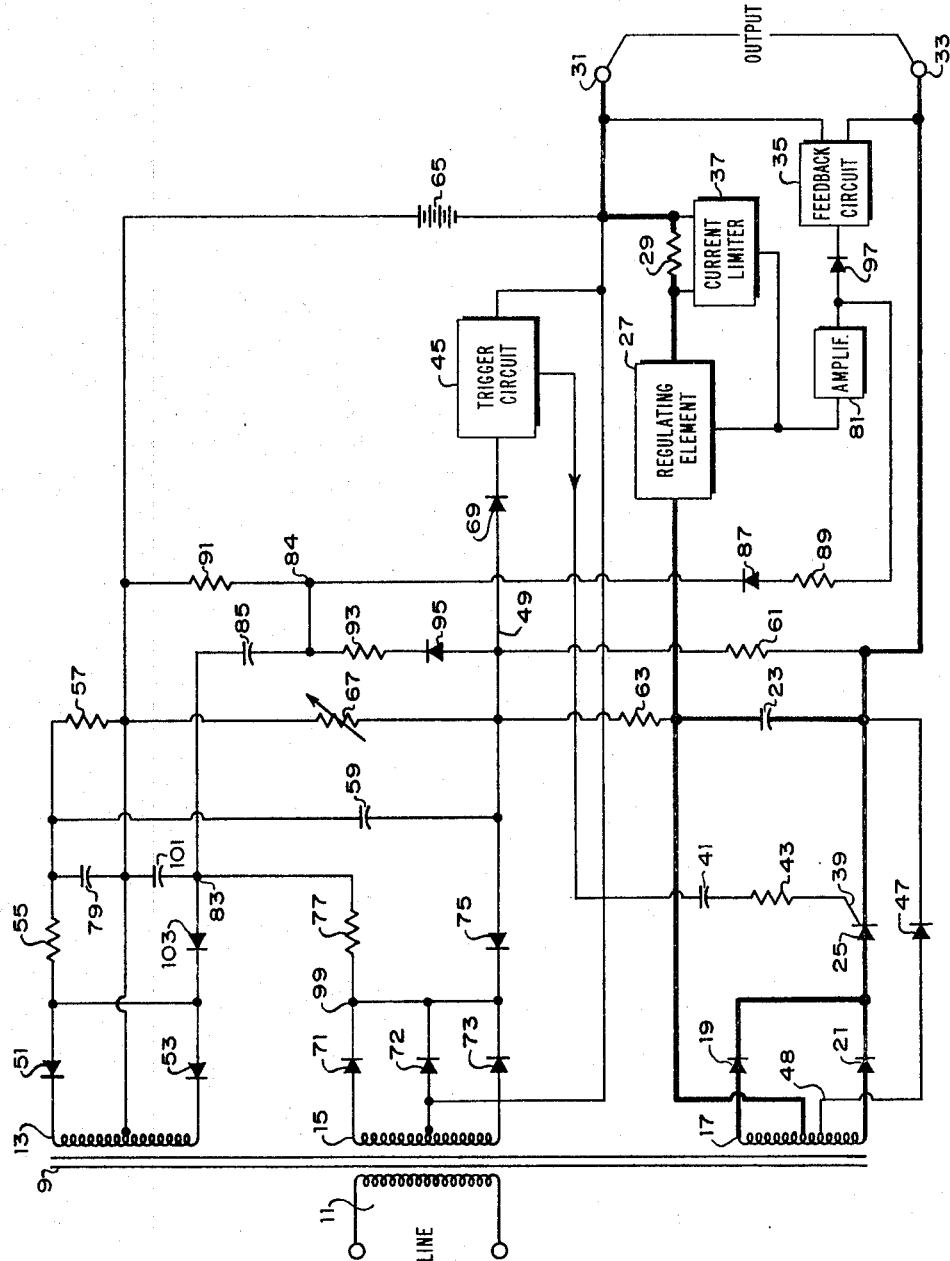

3,267,350
PREREGULATOR CIRCUIT
Robert E. Graham, Morris County, and Robert P. Buchner, Union County, N.J., assignors to Hewlett-Packard Company, Palo Alto, Calif., a corporation of California
Filed Oct. 19, 1962, Ser. No. 231,807
5 Claims. (Cl. 321—18)

This invention relates to a preregulator circuit for a line-operated power supply. More particularly, the invention relates to a circuit which uses a single controlled rectifier that is rendered conductive for a time which is determined by load voltage and current and by the amplitude of the line signal. This permits the regulating element of the power supply to operate at high efficiency with a low voltage drop across it for all operating conditions. Circuitry is provided for properly terminating the conduction cycle of the controlled rectifier, particularly after turn-on during the initial conduction cycles. This insures that the conduction current in the controlled rectifier is extinguished prior to the occurrence of a successive half-cycle of the line signal, thereby permitting independent control of the rectification characteristics for each half cycle of line signal. The regulating circuit following the preregulator of the present invention may be one of the types commonly used in the industry and described in U.S. Patents 2,915,693 and 2,942,174 issued, respectively, on December 1, 1959 and on June 21, 1960 to C. W. Harrison.

It is a principal object of the present invention to provide an improved preregulator circuit for a line-operated power supply.

It is another object of the present invention to provide a controlled rectifier circuit which supplies to the regulating circuit of the power supply a voltage slightly in excess of the desired output voltage for all line and load conditions.

In accordance with the illustrated embodiment of the present invention, the signal appearing on the line is applied to a storage capacitor through a controlled rectifier. The rectifier is rendered conductive by the output pulse produced by a trigger circuit in response to an input signal. The input signal comprises the combination of signals related to the voltage and to the current at the output of the power supply, a bias signal and a signal related to the amplitude of the line signal. The controlled rectifier thus is triggered into the conduction region when this input signal attains a selected value. The storage capacitor, which is connected at the input of the regulator circuit of the power supply, is charged from the line signal during the conduction cycle. The time during which the controlled rectifier is conductive determines the amount of charge and, hence the voltage on the storage capacitor. The voltage on the storage capacitor is maintained at a value which exceeds the output voltage of the power supply by an amount sufficient to bias the regulating element. This preregulation permits the regulating circuit to operate with low power loss for all conditions of line voltage, load voltage and load current.

Other and incidental objects of the present invention will be apparent from a reading of this specification and an inspection of the accompanying drawing which shows a schematic diagram of the preregulating circuit of the present invention.

Referring to the drawing, there is shown a transformer 9 having a primary winding 11 connected to the line and having center-tapped secondary windings 13, 15 and 17. The rectified voltage from the full-wave rectifier which includes secondary winding 17 and diodes 19 and 21 is applied to the storage capacitor 23 through the controlled rectifier 25. This controlled rectifier may be any device which can be rendered conductive by a signal applied to a trigger electrode of the device and which is rendered nonconductive when the voltage across the device decreases below a critical value. Thyratrons are typical of devices which operate in this manner. The illustrated embodiment of the invention uses a semiconductor device 25 which has a trigger electrode 39 and which is commonly called a silicon controlled rectifier. The regulating circuit of the power supply includes storage capacitor 23, regulating element 27 and dropping resistor 29 serially connected between the output terminals 31 and 33. The impedance of the regulating element 27 is controlled by the feedback circuit 35 which responds to variation of the output voltage about a selected value. The impedance of the regulating element 27 is also controlled by the current limiter 37 which responds to the voltage produced across resistor 29 by the output current. The impedance of the regulating element 27 is so controlled by the feedback circuit 35 and by the current limiter 37 that the load voltage remains constant for varying load conditions until current-limit operation occurs, at which time the output voltage decreases in order that the load current may remain constant for increasing load requirements.

At the same time, the controlled rectifier 25 is operated over selected portions of half cycles of the line signal to compensate for changing line and load conditions. The conduction cycle of the controlled rectifier 25 is initiated by a pulse applied to the trigger electrode 39 through the differentiating network including capacitor 41 and resistor 43 from the trigger circuit 45. The conduction cycle is terminated when the voltage across the controlled rectifier 25 decreases substantially to zero. Diode 47 connected to tap 48 on the winding 17 becomes operative at turn-on to supply a small voltage to capacitor 23 prior to the initial conduction cycle of controlled rectifier 25. The necessity for the circuit including diode 47 is based upon the requirement in certain controlled rectifiers of a finite time after cessation of forward conduction current for the controlled rectifier to return to its non-conductive state. The small voltage thus provided on capacitor 23 insures the positive termination of the conduction cycle for all operating conditions.

Trigger circuit 45 is switched once each half cycle by the signal appearing on line 49. This signal comprises the combination of half cycles of a negative-going sine wave and a positive-going ramp voltage which has a slope that is determined by the combination of the output voltage and current. The negative-going sine wave is provided by the full-wave rectifier which includes winding 13 and diodes 51 and 53. The half-wave rectified line-signal is divided down by the combination of resistors 55 and 57 and is applied to one terminal of capacitor 59. The positive-going ramp signal appears at the other terminal of capacitor 59 and is produced by the current which flows into the capacitor 59 through resistor 61 and by the current which flows out of capacitor 59 through resistor 63, which currents are proportional to the output voltage and output current, respectively. Battery means 65 and resistor 67 supply charging current to capacitor 59 which is sufficient to buck the outflow of current in resistor 63 and to provide a ramp signal of proper slope for the conditions of zero voltage and zero current. The sum of the negative-going half-cycles of line signal and the positive-going ramp signals appear on line 49 and attain a value which is sufficiently positive to forward bias diode 69. Trigger circuit 45 is switched from one operating state to another operating state in response to the change in conductivity of diode 69. Thus the time at which trigger circuit 45 is switched is determined by the amplitude of the line signal, the load current, the load voltage and the bias adjustment of resistor 67. It can be seen that high output voltage appearing across terminals 31 and 33 produces a positive-going signal on line 49 having a large slope and that high output current causing a drop in regulator voltage also produces a positive-going signal on line 49 having a large slope. Either one of these conditions or both in combination cause the silicon-controlled rectifier to become conductive at an earlier time, thereby providing a long conduction cycle and hence, greater charging current for capacitor 23. Similarly, the negative-going half-cycles of the line signal applied to the opposite terminal of capacitor 59 cause trigger circuit 45 to switch at a later time in each half cycle as the amplitude of the line signal increases. Thus for given load requirements at the output terminals 31 and 33, an increase in the amplitude of the signal applied to winding 11 is counteracted by a later firing time, thereby providing a shorter conduction cycle of the controlled rectifier 25 and thereby eliminating any change in the charging current per half cycle for capacitor 23.

In order to insure that the proper conduction time is established for each half cycle, it is essential that the capacitor 59 be discharged at the end of each half cycle and recharged according to new line and load conditions. This is accomplished using the full-wave rectifier which includes winding 15 and diodes 71 and 73. Diode 75, which is normally back biased by the signal appearing at node 99, is rendered conductive when the voltage applied thereto from the full-wave rectifier decays to a value less than the voltage appearing at line 49. The resetting operation of capacitor 59 takes place at the crossover region of the input sine wave. The voltage at node 99 is a positive-going rectified sine wave referenced to output terminal 31. Resistor 77 is connected between nodes 83 and 99 and thus always has current through it. Resistor 77 is selected to provide sufficient current to discharge capacitor 59 when diode 75 becomes forward biased while also keeping diode 71 (or 73) in the conducting state. When the voltage across winding 15 goes to zero, the voltage at node 99 would tend to go to about −0.6 volt (diode 71 or 73 still conducting) but for the clipping action of diode 72 which limits the negative excursion of the voltage at node 99 to about −0.2 v. This eliminates possible differences in the forward characteristics of diodes 71 and 73 and insures that capacitor 59 will be reset to the same voltage level each half cycle. Exclusion of diode 72 in this reset operation causes current pulses in diodes 19 and 21 to become unbalanced thus causing poorer overall efficiency and decreased reliability of diodes 19, 21 and 25 and of the storage capacitor 23 due to increased R.M.S. currents through them.

It is necessary to delay the operation of the regulating circuit at turn-on in order to prevent the output current from being supplied through the diode 47 and in order to permit the preregulating circuit to take control of the voltage on capacitor 23. At turn-on, capacior 101 charges to full negative voltage in a very few half cycles through the low charging impedance of diodes 51, 53, and 103 and the resistance of winding 13. Since the charging resistance for capacitor 85 is large compared to that for capacitor 101, the voltage across capacitor 85 remains substantially at zero as node 83 goes negative. Capacitor 85 then charges through resistors 89, 93 and 91 and the voltage at node 84 varies exponentially from the full negative voltage at node 83 to the positive voltage of battery means 65. The charging current through resistor 93 and diode 95 maintains the trigger circuit 45 inoperative until diode 95 becomes back biased. At a later time diode 87 becomes back biased and the regulator including amplifier 81 becomes operative. The voltages across diodes 87 and 95 thereafter and during normal operating conditions is sufficient to maintain both diodes back-biased. In practice, the charging current through diode 95 and resistor 93 maintains the trigger circuit 45 inoperative for a selected time, say 100 milliseconds. When the capacitor 85 has charged sufficiently, diode 95 becomes back biased and the trigger circuit is rendered operative. The preregulating circuit is thereby rendered operative to control the voltage on capacitor 23. Charging current continues to flow in resistor 89 and diode 87 for a selected time, say 150 milliseconds, after which time diode 87 becomes back biased. Diode 97 thus becomes forward biased at a time when the preregulator circuit has control over the voltage applied to capacitor 23. The circuit thereafter operates as previously described.

Therefore, the circuit of the present invention provides a voltage at the input of the regulating circuit of a power supply which is a small constant voltage larger than the required output voltage for all conditions of load voltage and current and line voltage. The regulating circuit operating in this manner thus operates with high efficiency because the power loss in the regulating element is small and proportional to this constant voltage. In addition, accurate termination of the conduction cycle of the controlled rectifier is provided by the circuit of the present invention. Further, damage to internal and external circuits is minimized by the turn-on sequence of the preregulating and regulating circuits provided by the present invention.

We claim:
1. A regulated power supply comprising:
   means adapted to receive an alternating current energy,
   a load circuit supplied with direct current energy therefrom,
   a switch having a pair of current conducting electrodes included in said circuit and a gate electrode,
   a storage element,
   means including said switch connected to said storage element for charging said storage element from said alternating current energy,
   a regulating device connected in said load circuit,
   a timing capacitor,
   means for periodically charging said timing capacitor at a varying rate,
   means for varying the magnitude of said rate including means for supplying to said timing capacitor
      (a) a periodically-varying signal related in amplitude and synchronously related in time to said alternating current energy,
      (b) a second signal related to voltage variations across said regulating device,
      (c) a third signal related to voltage variations in said load circuit, and
   trigger circuit means connected to said timing capacitor for passing a gating signal to said gate electrode whenever the charge across said timing capacitor equals a predetermined value, whereby said gating signal from said trigger circuit means fires said controlled rectifier at a point in each cycle of said alternating current energy that is dependent upon the alternating current signal magnitude, load current, and load voltage.

2. The power supply set forth in claim 1 wherein said switch is a controlled rectifier and which power supply also includes a uni-directional conducting element connected between said storage element and said means for receiving said alternating current energy for supplying a predetermined portion of said alternating current energy to said storage element, thereby to facilitate the operation of said controlled rectifier during start-up.

3. The power supply set forth in claim 1 which also includes bias means connected to said regulating device and to said trigger circuit means for maintaining the same inoperative until the charge in said storage element achieves a predetermined level during start-up.

4. The power supply set forth in claim 1 which also includes a rectifier connected between said alternating current energy means and said timing capacitor for supplying said alternating current energy to said timing capacitor.

5. The power supply set forth in claim 4 wherein
the means for varying the magnitude of said rate includes a source of potential of adjustable magnitude thereby to permit the additional adjustment of the magnitude of said rate, and
said switch is a controlled rectifier and which power supply also includes a uni-directional conducting element connected between said storage element and said means for receiving said alternating current energy for supplying a predetermined portion of said alternating current energy to said storage element, thereby to facilitate the operation of said controlled rectifier during start-up.

References Cited by the Examiner

UNITED STATES PATENTS

| | | | |
|---|---|---|---|
| 2,904,742 | 9/1959 | Chase | 323—22 |
| 3,040,183 | 6/1962 | Farnsworth | 323—22 X |
| 3,049,658 | 8/1962 | Krsna | 323—22 |
| 3,068,392 | 12/1962 | Santelmann | 323—22 X |
| 3,114,097 | 12/1963 | Clark | 323—22 X |
| 3,117,273 | 1/1964 | Magnusson | 323—22 |
| 3,213,351 | 10/1965 | Walker | 321—18 |

OTHER REFERENCES

Riordon: "Power Supply Uses Switching Preregulation," Electronics, March 9, 1962, pp. 62–64.

JOHN F. COUCH, *Primary Examiner.*

LLOYD McCOLLUM, *Examiner.*

K. HADLAND, K. D. MOORE, *Assistant Examiners.*